United States Patent [19]

Gärtner

[11] Patent Number: 5,740,786
[45] Date of Patent: Apr. 21, 1998

[54] INTERNAL COMBUSTION ENGINE WITH AN EXHAUST GAS RECIRCULATION SYSTEM

[75] Inventor: Uwe Gärtner, Remshalden, Germany

[73] Assignee: Mercedes-Benz AG, Stuttgart, Germany

[21] Appl. No.: 844,823

[22] Filed: Apr. 22, 1997

[30] Foreign Application Priority Data

May 10, 1996 [DE] Germany .......... 196 18 868.7

[51] Int. Cl.⁶ .......... F02M 25/07; F02B 33/44
[52] U.S. Cl. .......... 123/570; 123/556; 60/605.2
[58] Field of Search .......... 123/568, 569, 123/570, 556; 60/605.2

[56] References Cited

U.S. PATENT DOCUMENTS

| | | | |
|---|---|---|---|
| 3,877,447 | 4/1975 | Ross, Sr. .......... | 123/570 |
| 4,674,463 | 6/1987 | Duckworth et al. .......... | 123/570 |
| 5,040,518 | 8/1991 | Hamm .......... | 123/570 |
| 5,131,229 | 7/1992 | Kriegler et al. .......... | 60/605.2 |
| 5,213,086 | 5/1993 | Sims .......... | 123/556 |
| 5,357,936 | 10/1994 | Hitomi et al. .......... | 60/605.2 |
| 5,456,240 | 10/1995 | Kanesaka .......... | 60/605.2 |
| 5,607,010 | 3/1997 | Schonfeld et al. .......... | 60/605.2 |

FOREIGN PATENT DOCUMENTS

| | | |
|---|---|---|
| 26 10 192 | 9/1977 | Germany . |
| 40 07 516 | 9/1991 | Germany . |
| 42 35 794 | 10/1993 | Germany . |

*Primary Examiner*—Willis R. Wolfe
*Attorney, Agent, or Firm*—Klaus J. Bach

[57] ABSTRACT

In an internal combustion engine with an exhaust gas recirculation system and an exhaust gas turbocharger having a turbine arranged in an exhaust gas duct and a compressor operated by the turbine and being disposed in an air supply duct for supplying charge air to the engine, an exhaust gas recirculation line extends between the exhaust gas duct upstream of the turbine and the air supply duct and downstream of the compressor. Cooling means are arranged in the exhaust gas duct and heating means are arranged in the air supply duct upstream of the compressor to permit the generation of a pressure differential between the exhaust gas duct and the air supply duct which provides for an exhaust gas recirculation flow through the exhaust gas recirculation line over a large engine operating range.

7 Claims, 4 Drawing Sheets

INTERNAL COMBUSTION ENGINE WITH AN EXHAUST GAS RECIRCULATION SYSTEM

BACKGROUND OF THE INVENTION

The invention relates to an internal combustion engine with an exhaust gas recirculation system including an exhaust gas turbocharger which is driven by the exhaust gas discharged from the engine and which compresses the air supplied to the engine.

DE 40 07 516 A1 discloses a Diesel engine with an exhaust gas recirculation system whose purpose is to minimize the noxious emissions of a Diesel engine over its whole operating range. The exhaust gas recirculation system includes, down-stream of exhaust gas turbine, an oxidizing catalytic converter. Downstream of the catalytic converter, there is a particle filter and downstream of the particle filter, there is an exhaust gas cooler whose discharge pipe leads to the fresh air supply pipe. The compressor receives a mixture of fresh combustion air and recirculated exhaust gas from fresh combustion air supply and exhaust gas recirculation lines which each include a throttle for controlling the respective amounts. The air and exhaust gas mixture flows through the compressor and is supplied to the engine inlet.

However, such an exhaust gas recirculation system has the disadvantage that exhaust gas flows through the compressor whereby the compressor becomes subjected to the particles still contained in the exhaust gas and, accordingly, to increased wear. And this also applies to the intercooler which is arranged downstream from the compressor.

It is also known to provide an exhaust gas recirculation system for charged internal combustion engines wherein exhaust gas is diverted from a pipe section between the engine and the turbine and is then conducted through a separate exhaust gas cooler. The cooled exhaust gas is then admixed to the combustion air downstream of the intercooler. However, such an arrangement becomes inoperative as soon as the charge air pressure downstream of the compressor exceeds the exhaust gas pressure upstream of the turbine. In this case, there is no pressure differential for generating the exhaust gas recirculation. A pressure differential which permits exhaust gas recirculation is called a negative scavenging head. The switch-over point between positive and negative scavenging head is known under the expression "Buechi point".

The natural negative scavenging head for such exhaust gas recirculation systems can be expanded by additional components such as ejectors or various throttling structures which utilize the natural negative pressure differential. However, such measures are not only expensive to manufacture, but they utilize additional components occupying space in the engine compartment.

It is the object of the present invention to provide an exhaust gas recirculation system for an internal combustion engine with which the operational range for the exhaust gas recirculation can be substantially expanded without the need for additional components.

SUMMARY OF THE INVENTION

In an internal combustion engine with an exhaust gas recirculation system and an exhaust gas turbocharger having a turbine arranged in an exhaust gas duct and a compressor operated by the turbine and being disposed in an air supply duct for supplying charge air to the engine, an exhaust gas recirculation line extends between the exhaust gas duct upstream of the turbine and the air supply duct and downstream of the compressor. Cooling means are arranged in the exhaust gas duct and heating means are arranged in the air supply duct upstream of the compressor to permit the generation of a pressure differential between the exhaust gas duct and the air supply duct which provides for an exhaust gas recirculation flow through the exhaust gas recirculation line over a large engine operating range. With the exhaust gas recirculation system according to the invention, the negative scavenging head is substantially increased and it also provides for an improved control of the exhaust gas recirculation. This result is obtained by changing, in a controlled manner, the power balance between the turbine and the compressor. The relationship becomes clearer by a diagram wherein, on one hand the turbine pressure drop ratio that is the ratio of the exhaust gas pressure $p_3$ ahead of the turbine to the pressure $p_4$ after the turbine and the charge air pressure ratio, that is, the pressure $p_2$ after the compressor to the pressure $p_1$ ahead of the compressor are plotted for various values of the product of the total efficiency of the exhaust gas turbocharger and the quotient of the temperature $t_3$ ahead of the turbine and the temperature $t_1$ ahead of the compressor which values are assumed to be constant. With an acceptable neglect of the pressures $p_1$ and $p_4$ this product must exceed the value 1.5 if a positive pressure drop is to be achieved—that is, the pressure $p_3$ ahead of the turbine is greater than the pressure $p_2$ ahead of the compressor. As soon as the product is below this value of 1.5, the pressure $p_3$ ahead of the turbine is greater than the charge air pressure after the compressor. Under these conditions, exhaust gas recirculation is possible.

With the arrangement according to the invention, the negative pressure drop is accordingly expanded in that the temperature $t_3$ ahead of the turbine is lowered and/or the temperature $t_1$ ahead of the compressor is raised. In this manner, a negative scavenging head can be provided if desired with components which are already present in an exhaust gas recirculation system. As a result, the product of the efficiency and the ratio of the temperatures $t_3$ to $t_1$ is adjustable for the respective operating ranges so that exhaust gas recirculation may be obtained which results in a substantial reduction of the nitrogen oxide in the exhaust gas of internal combustion engine utilizing such a temperature controlled exhaust gas recirculation.

In accordance with a preferred embodiment of the invention, the components for reducing or increasing the temperatures $t_1$ and $t_3$ are exhaust gas heat exchangers. Consequently, well known, reliable components which are present anyway in the exhaust gas recirculation system can be utilized.

In accordance with a further advantageous embodiment of the invention, a double path exhaust gas heat exchanger is arranged ahead of the turbine. The exhaust gas discharged from the engine is conducted to the turbine by way of the exhaust gas heat exchanger. In the heat exchanger, the exhaust gas transfers its heat to the fresh combustion air which is also conducted through the heat exchanger whereby the temperature $t_3$ at the turbine inlet is reduced and the temperature $t_1$ at the compressor inlet is increased. Consequently, a component generally used in exhaust gas recirculation systems is utilized that is a heat exchanger which has been used so far exclusively for cooling the exhaust gas. In this heat exchanger, the recirculated exhaust gas was cooled by engine coolant for which the engine cooling system had to be modified. With the arrangement according to the invention, this disadvantage is avoided since the fresh combustion air is used as the coolant so that there is no additional load on the cooling system.

In addition, the arrangement according to the invention makes it possible to preheat the fresh combustion air during engine operation without exhaust gas recirculation so that cold-start and warm-up of the engine are improved, which results in a substantial reduction of particle emissions and of engine fuel consumption.

In accordance with another advantageous embodiment of the invention, the exhaust gas heat exchanger is arranged downstream of the turbine. This alternative arrangement has the advantage that the energy which is still present in the exhaust gas after leaving the turbine and which would otherwise be lost to the environment, is utilized. Fresh combustion air is again utilized in this embodiment as the coolant which again simplifies the vehicle cooling circuit arrangement.

In still another embodiment of the invention, an exhaust gas heat exchanger is arranged ahead of the exhaust gas turbine and the exhaust gas is cooled in the heat exchanger by coolant of a cooling system. In this case, the temperature $t_3$ ahead of the turbine is reduced whereby the range of the negative scavenging head for the exhaust gas recirculation can again be expanded. The coolant ducts of the cooling system are advantageously coupled with a passenger compartment heating system. Also, the coolant may be supplied to the engine cooling system after passing through the exhaust gas heat exchanger whereby excessive cooling of the engine, particularly in stop-and-go traffic is avoided.

In a further advantageous embodiment of the invention an exhaust gas heat exchanger is arranged ahead of the compressor such that the exhaust gas which is diverted at the turbine entrance is conducted through the heat exchanger. In this arrangement the temperature $t_1$ of the fresh combustion air is increased ahead of the compressor whereby again the range of the negative scavenging head can be increased.

In another advantageous embodiment of the invention, the exhaust gas duct includes, adjacent the engine exit, a flow divider by which the exhaust gas flow which is directed without cooling, directly to the engine air intake and the exhaust gas flow which is directed to the heat exchanger can be controlled.

Preferred embodiments of the invention will be described below on the basis of the accompanying drawings.

DESCRIPTION OF THE VARIOUS EMBODIMENTS

Figure 1:
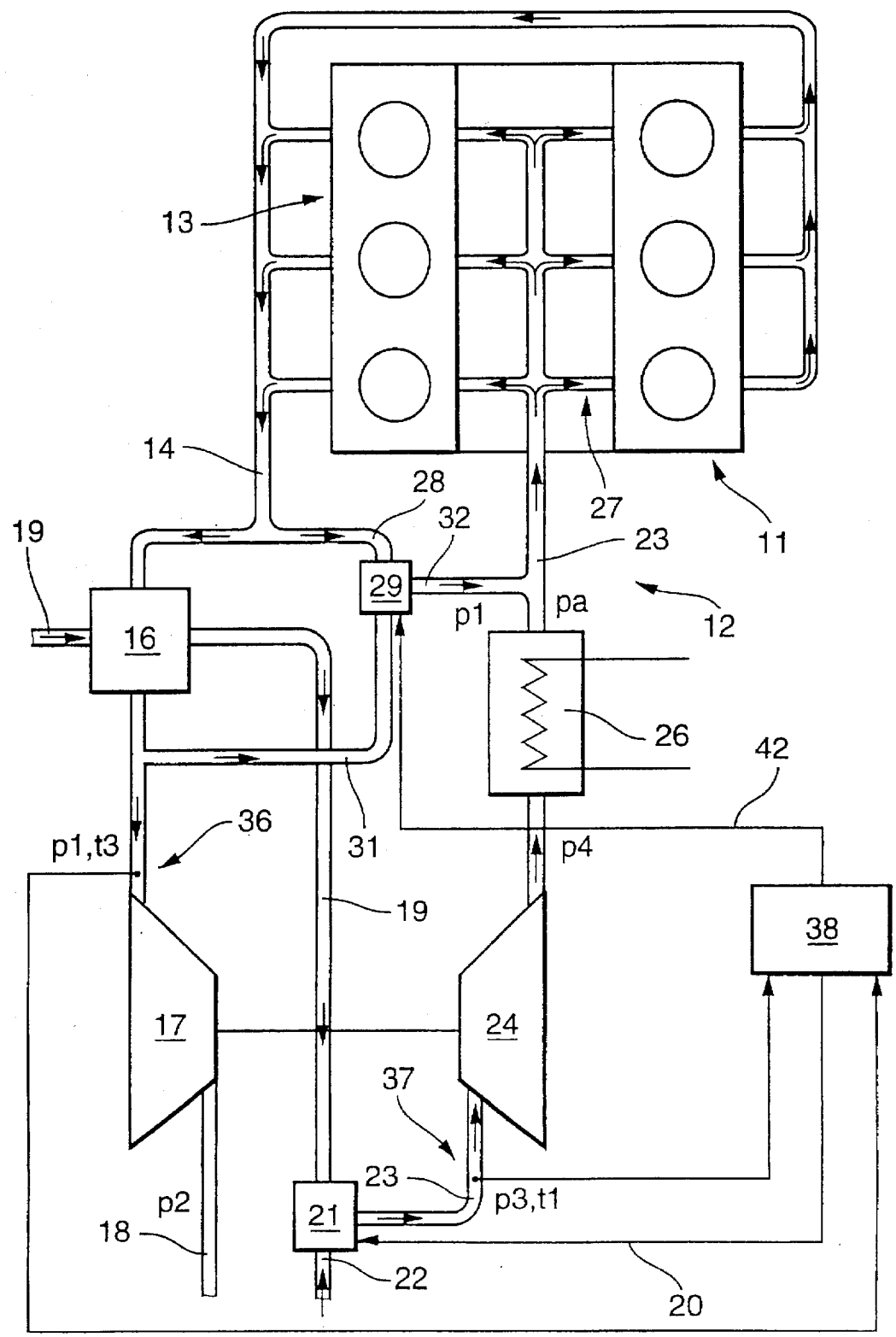
FIG. 1 shows schematically a temperature-controlled exhaust gas recirculation system according to the invention.

FIG. 1 shows schematically an internal combustion engine 11 with an exhaust gas recirculation system 12. From the engine exhaust 13 an exhaust gas duct 14 which includes a heat exchanger 16, leads to a turbine 17. After passing through the turbine 17, the exhaust gas is directed into an exhaust pipe 18 of an exhaust system and is then discharged into the environment.

A combustion air conduit 19 or respectively, a fresh intake air conduit also extends through the heat exchanger 16 to conduct fresh combustion air to the engine in heat exchange relation with the exhaust gas in the exhaust gas duct 14. The combustion air duct 19 leads, downstream of the exhaust gas heat exchanger 16, to a flow mixing valve 21 to which a fresh air supply duct 22 is connected and which controls the volume ratio of heated fresh air and non-heated fresh air providing for the appropriate mixture to be supplied, via a common combustion air supply duct 23, to a compressor 24 of a turbocharger. Down-stream of the compressor 24, the compressed combustion air flows through a charge air cooler 26 and then reaches the intake manifold of the internal combustion engine 11.

Between the engine exhaust and the heat exchanger 19 a first recirculation line 28 branches off the exhaust gas duct 14 which by way of a mixing valve 29 is in communication with a second recirculation line 31 through which cooled exhaust gas can be supplied to the mixing valve 29. An exhaust gas recirculation pipe 32 extending from the mixing valve 29 joins the fresh air supply duct 23 downstream of the charge air cooler 26.

During engine operation with exhaust gas recirculation the pressure $p_3$ in the exhaust gas duct 14 and in the exhaust gas recirculation pipe 32 must be greater than the pressure in the combustion air supply duct 23 downstream of the charge air cooler 26 so that the exhaust gas can flow, by way of the exhaust gas recirculation pipe 32, to the air supply duct 23. With the arrangement according to the invention as shown in FIG. 1, this pressure differential or negative scavenging head is expanded by reducing the temperature $t_3$ of the exhaust gas before it enters the turbine 17 and, at the same time, increasing the temperature $t_1$ of the fresh combustion air supplied to the compressor 24.

The exhaust gas temperature $t_3$ ahead of the turbine is lowered by the heat exchanger 16 wherein heat is transferred from the exhaust gas to the combustion air and the combustion air temperature in the combustion air duct 19 is thus increased. By controlling the position of the flow mixing valve 21, the temperature $t_1$ of the heated combustion air which is supplied to the combustion air duct 19 and to the compressor 24 can be adjusted to a desired value.

Depending on the desired exhaust gas recirculation rate and the temperature difference, or respectively, the pressure difference between the exhaust gas recirculation pipe 32 and the air supply duct 23, the position of the mixing valve 29 can be adjusted to control the exhaust gas flow to the air supply duct 23. With the relative exhaust gas flow admitted from the first and second exhaust gas recirculation lines 28 and 31 the temperature of the exhaust gas in the exhaust gas recirculation pipe 32 can be fine-adjusted.

With the setting of the flow mixing valves 21 and 29 also the pressure differential can be adjusted whereby an accurate control and an increase of the range of the negative scavenging head may be achieved.

Alternatively, the heated combustion air in the combustion air duct 19 may be directly supplied to the compressor 24. In order to prevent an excessive temperature increase of the combustion air, the exhaust gas duct 14 may include a bypass duct around the heat exchanger 16 which rejoins the exhaust gas duct 14 immediately ahead of the turbine 17.

During engine operation without exhaust gas recirculation through the exhaust gas recirculation system 12, it is possible with arrangement of the heat exchanger 16 in the combustion air duct 19 to heat the combustion air such that, during cold starts and during the warm-up period, the internal combustion engine emissions are relatively low. In this operating phase, the mixing valve 29 is so controlled that the exhaust gas recirculation pipe 32 and the second recirculation line 31 are closed.

The control for the adjustment of a negative scavenging head will be explained in an exemplary manner on the basis of the exhaust gas recirculation system 12 as shown in FIG. 1. For the adjustment of the negative scavenging head which is determined by a dimensionless characteristic value which results from the product of the overall efficiency value of the turbocharger and the temperature quotient of the exhaust gas temperature $t_3$ ahead of the turbine 17 and the combustion air temperature $t_1$ ahead of the compressor 24, it is necessary to record these engine operating values. The actual temperatures are sensed by a temperature sensor 36 arranged in the exhaust gas duct 14 ahead of the turbine 17 and a temperature sensor 37 arranged in the air supply duct 3 ahead of the compressor 24. The actual sensed temperature values are transmitted to a controller 38. The controller 38 is in communication with the engine management system. In this controller, the desired values of the dimensionless characteristic value are recorded in dependence on engine load and engine speed. The exhaust gas recirculation volume can be controlled depending on the engine operating points by way of the control line 20 which is connected to the flow mixing valve 21 and by way of the control line 42 which is connected to the mixing valve 29. The positions of the control elements for the flow mixing valves 21, 29 are also recorded in the electronic control unit so that the exhaust gas recirculation can be controlled depending on the load state and the engine speed and the values are recorded in a performance graph.

In the electronic control, there is also a temperature maximum value deposited which serves for the protection of the compressor 24 and which prevents that the maximally admissible inlet temperature $t_1$ of the compressor in dependence on the engine operating state is exceeded.

The same type of control can be used, in principle, also for the embodiments described below.

Figure 2:
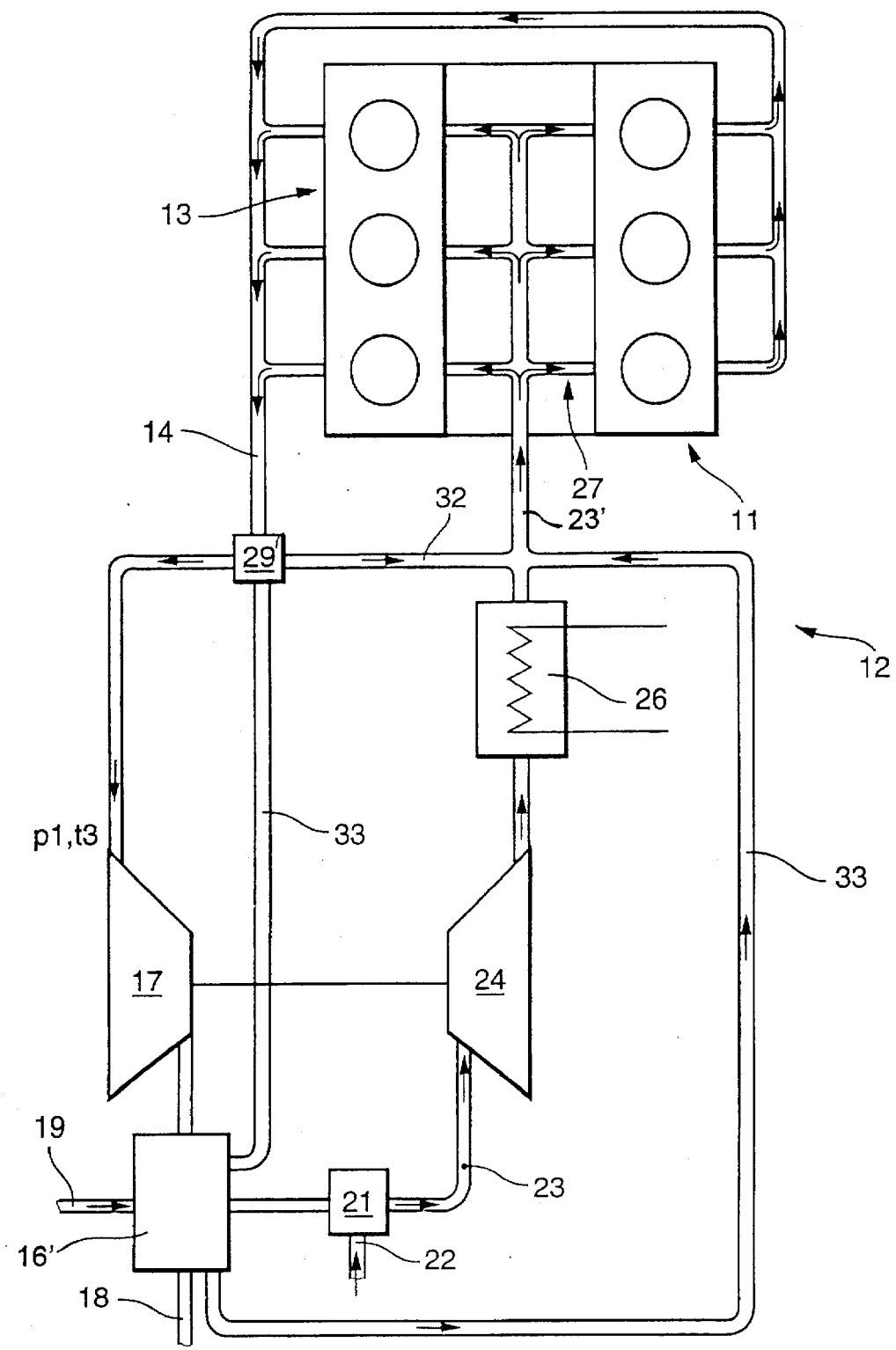
FIG. 2 shows an alternative embodiment of the arrangement shown in FIG. 1.

FIG. 2 shows an alternative embodiment of the invention. In this embodiment, only the temperature $t_1$ of the intake air ahead of the compressor 24 is increased for an increase of the negative scavenging head. Other than in the arrangement shown in FIG. 1, the exhaust gas heat exchanger 16' is arranged downstream of the turbine 17 and has an exhaust gas recirculation pipe 33 connected thereto. In order to provide for the required pressure difference, the flow mixing valve 21 can be so adjusted that either a part of the combustion air or all of it is heated in the heat exchanger 16' whereby the temperature $t_1$ at the inlet to the compressor 24 is increased to a desired value. With the exception of the exhaust gas which is directly recirculated, all the exhaust gas of the internal combustion engine 11 flows through the heat exchanger 16' for heating the combustion air. A bypass line 33 extends from the mixing valve 29 through the heat exchanger 16' and to the air supply duct 23'. In this way, hot exhaust gas from the exhaust gas recirculation line 32 and cooled exhaust gas from the bypass line 33 can be supplied to the air supply duct 23' downstream of the charge air cooler 26.

During operation without exhaust gas recirculation, the combustion air can be heated by the heat exchanger 16. Depending on the operating conditions, selectively heated combustion air or unheated combustion air or a mixture thereof may be supplied to the compressor, the various amounts being controllable by the flow mixing valve 21.

Figure 3:
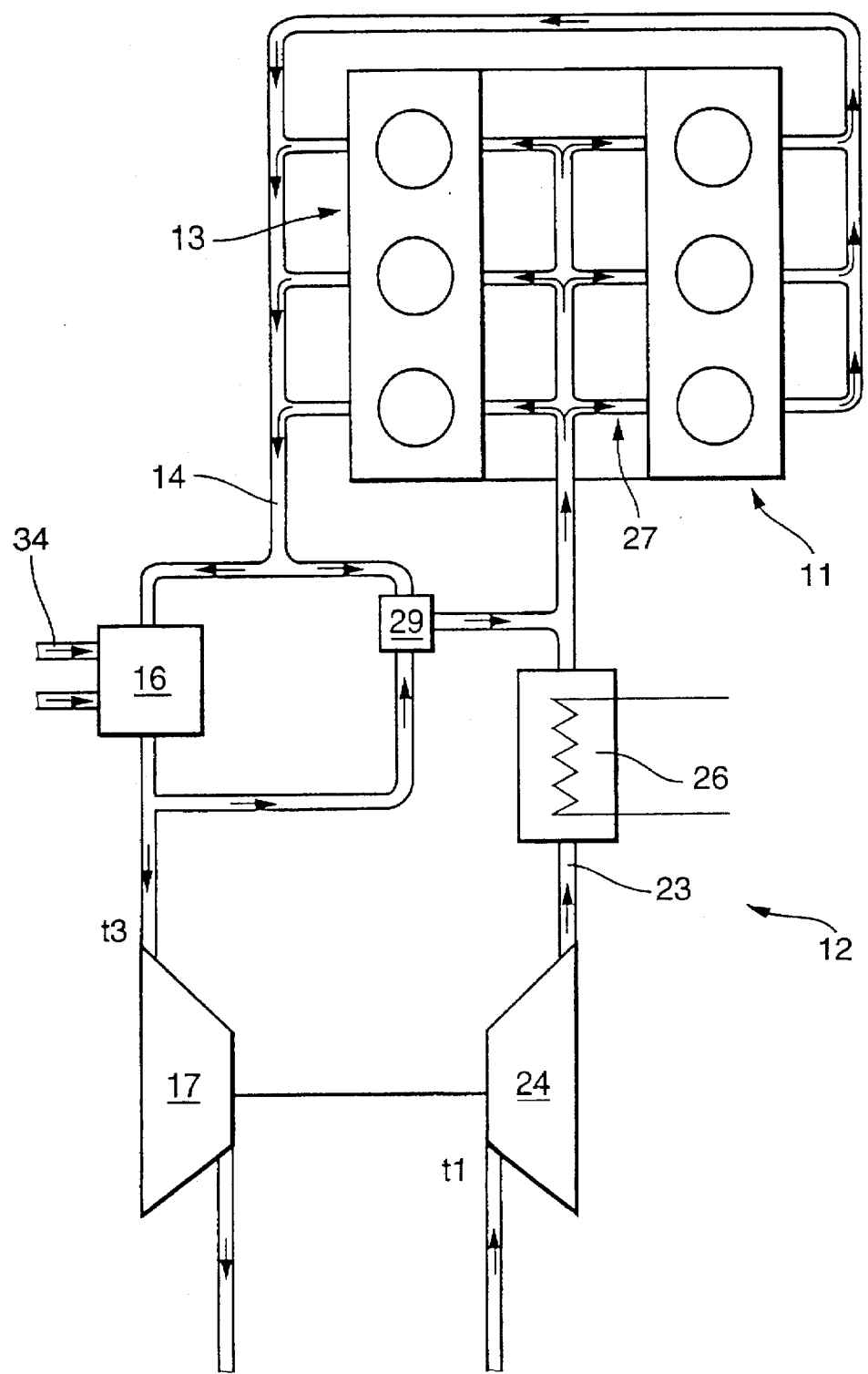
FIG. 3 shows another alternative embodiment of the arrangement shown in FIG. 1 and, FIG. 4 shows an alternative embodiment of the arrangement shown in FIG. 2.

FIG. 3 shows another alternative embodiment of FIG. 1. In this embodiment, the temperature $t_3$ of the exhaust gas is lowered ahead of the turbine so that the negative scavenging head can be maintained or, at least, is not increased. The temperature $t_1$ of the combustion air supplied to compressor 24 remains unchanged however. In this embodiment, the exhaust gas heat exchanger 16 is arranged between the engine exhaust 13 and the turbine 17. The temperature of the exhaust gas flowing through the exhaust gas duct 14 and through the exhaust gas heat exchanger 16 is lowered by a cooling system to a temperature $t_3$. The exhaust gas heat exchanger 16 is in communication by lines 34 with such a cooling system which may be for example a passenger compartment heating system.

During exhaust gas recirculation-free operation, the temperature of the combustion air is reduced by the charge air cooler 26 downstream of the compressor 24 and is then supplied to the internal combustion engine by way of the air supply duct 23. The exhaust gases leaving the internal combustion engine flow through the exhaust gas heat exchanger 16 to the turbine 17. The exhaust gas heat exchanger 16 can be operated by ambient air, by engine coolant or the coolant of a separate cooling circuit.

Figure 4:
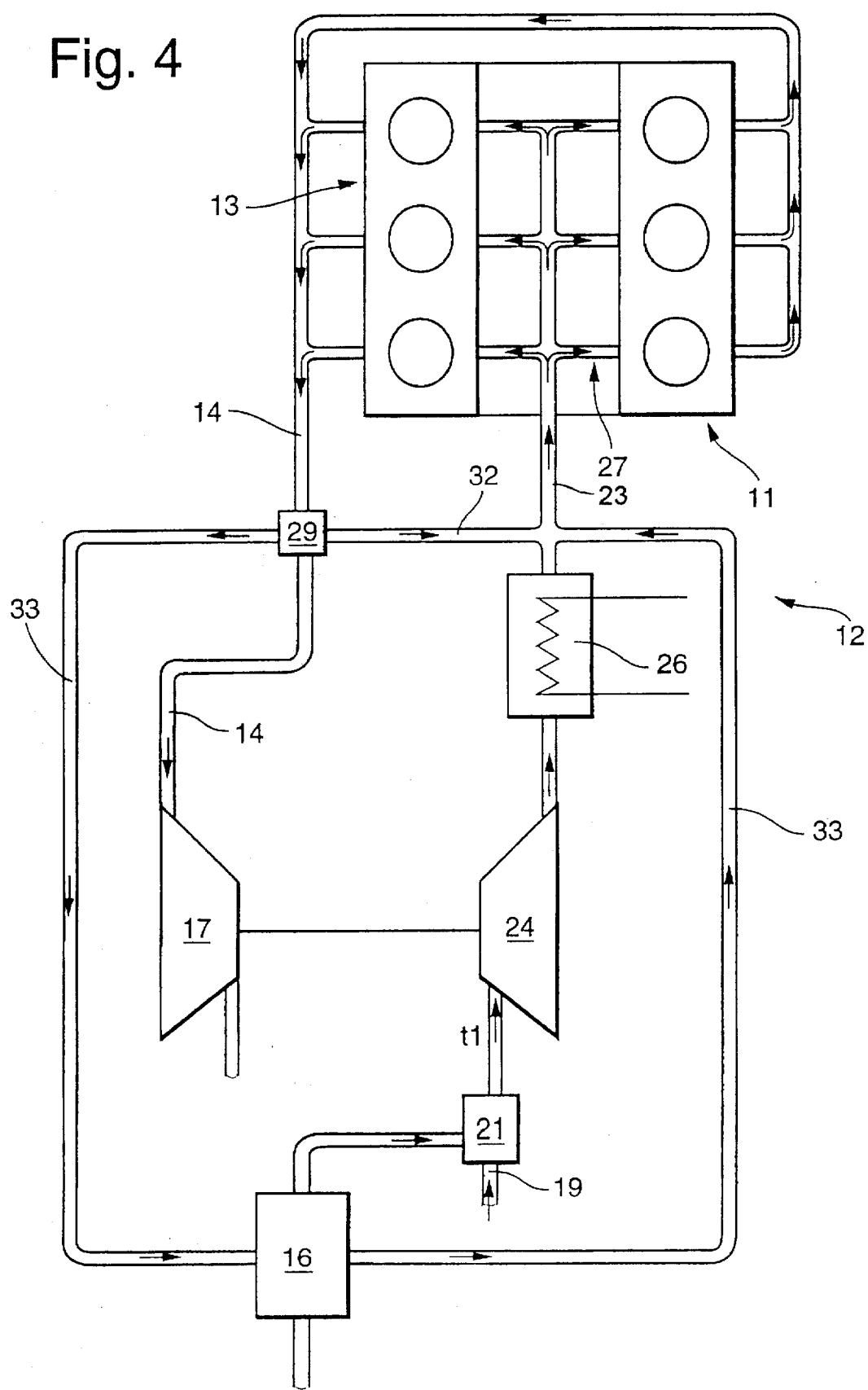

FIG. 4 shows an advantageous embodiment modified from the arrangement as shown in FIG. 2. In this embodiment, the temperature $t_1$ of the combustion air ahead of the compressor is increased such that the negative scavenging head can be adjusted or expanded. The temperature $t_1$ ahead of the compressor 24 is controlled by the flow mixing valve 21 which adds cooled combustion air from combustion air duct 19 to a combustion air flow heated in the heat exchanger 16. The exhaust gas heat exchanger 16 is heated by exhaust gas flowing through the bypass line 33.

The cooled exhaust gas flow is supplied to the air supply duct 23 downstream of the charge air cooler 26. Other than in FIG. 2, the exhaust gas leaving the turbine 17 is discharged directly to an exhaust gas system and to the environment. In this way, the exhaust gas heat exchanger 16 can be relatively small such that also the exhaust gas recirculating system is relatively small in volume when compared with the arrangement according to FIG. 2. This embodiment is advantageous where, by a suitable exhaust gas turbocharger design, there is already a large negative scavenging head so that a small increase of the charge air temperature $t_1$ ahead of the compressor is sufficient.

What is claimed is:

1. An internal combustion engine with an air supply duct and an exhaust gas duct and an exhaust gas recirculation system including an exhaust gas turbocharger having a turbine arranged in said exhaust gas duct so as to be driven by the exhaust gas discharged from said engine through said exhaust gas duct, and a compressor operated by said turbine and being in communication with said air supply duct for supplying charge air to said engine, an exhaust gas recirculation line extending between said exhaust gas duct upstream of said turbine and said air supply duct downstream of said compressor for recirculating exhaust gas from said exhaust gas duct to said air supply duct, a first heat exchanger arranged in said exhaust gas duct for reducing the temperature of the exhaust gas therein, a second heat exchanger arranged in said air supply duct for increasing the temperature of said charge air supplied to said engine and means for controlling the temperature of the exhaust gas entering said turbine and of the charge air entering said compressor to thereby provide for a pressure differential between the exhaust gas in said exhaust gas duct and the charge air in said air supply duct over a large engine operating range.

2. An internal combustion engine according to claim 1, wherein said first heat exchanger is cooled by fresh air supplied to said compressor.

3. An internal combustion engine according to claim 2, wherein said first heat exchanger arranged in said exhaust gas duct upstream of said exhaust gas turbine is also arranged in a fresh air supply line for conducting fresh air to said compressor in heat exchange with the exhaust gas flowing through said exhaust gas duct.

4. An internal combustion engine according to claim 2, wherein first heat exchanger is a double exhaust gas path heat exchanger arranged in said exhaust gas duct downstream of said exhaust gas turbine, one of said exhaust gas paths being connected to said turbine and to an engine exhaust system and the other being in communication with said exhaust gas duct upstream of said turbine and said air supply duct for supplying cooled exhaust gas to said air supply duct for recirculation.

5. An internal combustion engine according to claim 1, wherein said first heat exchanger disposed in said exhaust gas duct is arranged upstream of said turbine and is connected to a cooling system for cooling the exhaust gas flowing through said first heat exchanger.

6. An internal combustion engine according to claim 2, wherein said first heat exchanger is arranged in a turbine-by-passing exhaust gas recirculating line whereby cooled exhaust gas is returned to said fresh air supply duct and fresh air heated in said first heat exchanger by said recirculated exhaust gas is supplied to said compressor.

7. An internal combustion engine according to claim 1, wherein a first mixing valve is arranged in the exhaust gas recirculation line and a second mixing valve is arranged in the air supply duct ahead of said compressor and a controller is provided for controlling said mixing valves depending on the temperature of the exhaust gas ahead of said turbine and of the intake air ahead of said compressor.

* * * * *